May 3, 1960 SABURO MUROGA 2,935,737

SWITCHING SYSTEM OF ELECTRICAL SIGNAL

Filed Aug. 28, 1956 4 Sheets-Sheet 1

May 3, 1960 SABURO MUROGA 2,935,737

SWITCHING SYSTEM OF ELECTRICAL SIGNAL

Filed Aug. 28, 1956 4 Sheets-Sheet 2

May 3, 1960 SABURO MUROGA 2,935,737

SWITCHING SYSTEM OF ELECTRICAL SIGNAL

Filed Aug. 28, 1956 4 Sheets-Sheet 3

May 3, 1960 SABURO MUROGA 2,935,737

SWITCHING SYSTEM OF ELECTRICAL SIGNAL

Filed Aug. 28, 1956 4 Sheets-Sheet 4

United States Patent Office 2,935,737
Patented May 3, 1960

2,935,737

SWITCHING SYSTEM OF ELECTRICAL SIGNAL

Saburo Muroga, Tokyo, Japan, assignor to Nippon Telegraph and Telephone Public Corporation, Tokyo, Japan, a corporation of Japan Application August 28, 1956, Serial No. 606,655
4 Claims. (Cl. 340—174)

This invention relates to magnetic switching devices and more particularly to magnetic switching system.

In the various equipments which comprises logical circuits, as for example electronic computer and telephone electronic exchange equipment, the switching device is one of the fundamental circuits, and is indispensable. And especially in the case of electronic computers and the like, to which a parametric excited resonator that is to say "parametron" is applied, a simple switching device without using vacuum tubes or parametric excited resonators has been in great demand. It is a principal object of the invention to provide a magnetic switching system and the magnetic device with which such a need is filled.

It is a primary object of this invention to provide a magnetic switching device having a simple construction, requiring only the placing of a few pieces of winding on a few small sized magnetic cores to construct a switching circuit.

A further object of this invention is to provide a switching system which can be very stably operated for a time extending over an exceedingly long period.

The invention has for its object, a switching device without accompanying significant time lag such as a mechanical relay or a parametric excited resonator necessitates, resulting in a switching device usable for an electronic computer or electronic exchange equipment for a telephone system or other various equipments requiring switching devices.

This invention provides a switching device which possesses excellent characteristics for use in various logical operation circuits using binary phase signals.

In order that it may be clearly understood and more readily carried into effect, the invention will now be described, by way of example, with reference to the accompanying drawings, in which.

The invention is constructed by winding primary windings and secondary windings on a magnetic core, and applying an electric current I to the primary winding so that the voltage V that is induced in the secondary winding, if non-linear type characteristic of the magnetic core is taken into account, then, becomes $$V=aI+bI^3+cI^5 \quad (1)$$

provided that $a$, $b$, $c$, . . . are complex numbers. But for approximate treatment, if terms of degrees higher than the third are ignored it is expressed thus, $$V=aI+bI^3 \quad (2)$$

Usually, $a$ has an imaginary number larger than its real number and $b$ has a real number larger than its imaginary number.

Figure 1:
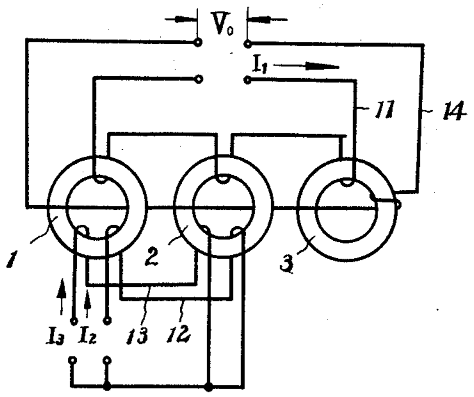
Figs. 1 and 2 are schematic diagrams of two examples of the circuit according to this invention.

Now, as shown in Fig. 1, for example, an input coil 11 and an output coil 14 are wound in series to three ferrite toroidal cores 1, 2 and 3 and control coils 12 and 13 are wound in series to the cores 1 and 2, so that in each of these magnetic cores the number of windings in an input coil 11 and an output coil 14 are the same, and the polarities of input and output windings are made in the same direction. On the magnetic core 3, as shown in Fig. 1, the input coil 11 is wound with the same number of turns on the cores 1 or 2, and the output coil 14 is wound with double the number as the cores 1 or 2. And the polarity of the output coil is opposite to that of the input coil. Moreover, the control windings 12 and 13 are wound in same direction, and, referring to the magnetic cores 1 and 2, assume them to take opposite directions against the input and output windings. Now if the electric current that flows in the input coil 11 is $I_1$ and the electric currents that flow in the control coils 12, 13 is $I_2$ and $I_3$ respectively, then the voltage $V_1$ that is induced in the end of the output coil at the magnetic core 1 is given as follows from the 2nd equation.

$$V_1=a(I_1-I_2-I_3)+b(I_1-I_2-I_3)^3 \quad (3)$$

Similarly, if the voltages that are induced in the output windings in the magnet cores 2 and 3 are denoted as $V_2$ and $V_3$, respectively following equations are obtained.

$$V_2=a(I_1+I_2+I_3)+b(I_1+I_2+I_3)^3 \quad (4)$$

$$V_3=-2(aI_1+bI_1^3) \quad (5)$$

Consequently, the voltage $V_O$ that appears at the output winding 14 is given as follows:

$$V_O=V_1+V_2+V_3$$
$$V_O=b(6I_1I_2^2+6I_1I_3^2+12I_1I_2I_3) \quad (6)$$

Therefore, in case of $I_2=-I_3$ $$V_O=0 \quad (7)$$

And suppose $I_2=I_3$, then, next equation is gained.

$$V_O=24bI_1I_3^2 \quad (8)$$

That is, it is possible to obtain only an output voltage which is proportional to the input signal current $I_1$, by a selection of the frequency of the control current $I_3$ beyond the frequency range of the signal current $I_1$ or as a direct current. In a case where the control current has the same frequency with the input signal, provision of a wave filter will cause the same effect. Further, as mentioned above, two currents with the same arbitrary frequency and with the same arbitrary waveform may be applied to the control windings in parallel. If the two currents have the same phase, the input and output coils 11 and 14 are coupled and if they have the opposite phase, coupling between two coils is cut off. It is needless to say that, in this case the optional frequency and wave form are applicable to the input signal current and control current.

Further, as mentioned above, if the two windings of the control coil which are in parallel, have currents of equal optional frequency and optional waveform and in the same phase, applied thereto then the input and output coils 11 and 14 are coupled. If control currents of opposite phase are applied then coupling is cut off. Therefore we can construct the switching device quite simply and easily. But, it is also possible to control the coupling between input and output coils by means of making or breaking of their control current, by using only one set of windings for the control coil in the cores 1 and 2.

Figure 2:
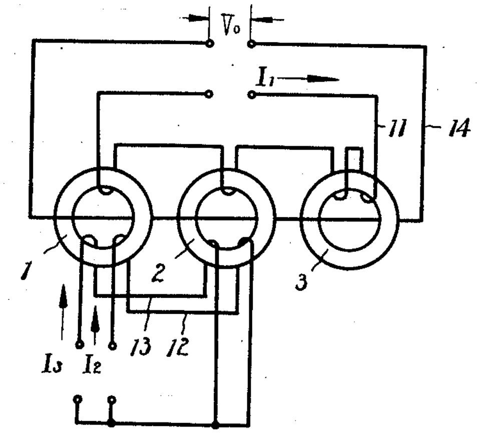

As mentioned above, the device of this invention has the appropriate input winding, output winding and control winding on the three magnetic cores, and in case no magnetic field, due to the control winding, is applied the components which are proportional to the input current in the output voltage induced on the output coil coupled with various magnetic cores cancel each other, and in case where alternate magnetic field due to the control coil is generated, there arises an output voltage which is proportional to the input current by the nonlinear characteristic of the magnetic cores or a small output voltage proportional to the odd powers of the input current. That is, in the example shown in Fig. 1, only an output voltage which is proportional to the input current of coil 11 is produced in case when the magnetic field was given by the current of control coil as shown in the Equation 8. But, for instance, as shown in Fig. 2, the magnetic cores 1 and 2 are the same as in Fig. 1, and the polarities of the input coil and output coil of the magnetic core 3 are also the same as in Fig. 1, but the winding number of input is double to those of cores 1 and 2 and output winding is wound with the same number as the magnetic cores 1 and 2. Therefore, if the current $I_2$ of the control coil 12 and the current $I_3$ of 13 have the relation $I_2=-I_3$, the output voltage $V_o$ to the input winding $I_1$ is given as, $$V_o=-6bI_1^3 \quad (9)$$

and in case of $I_2=I_3$ becomes as, $$V_o=24bI_1I_3^2-6bI_1^3 \quad (10)$$

and a component that is in proportion to the cube of the input signal current $I_1$ is contained in the output voltage. For the same usage, however, the output voltage corresponding to this term $6bI_1^3$ gives no trouble and control coils 12 and 13, even though the signal current flows in the output coil, no voltage is induced in the input coil, so that the back coupling from the output coil to the input windings can be cut off completely.

Figure 3:
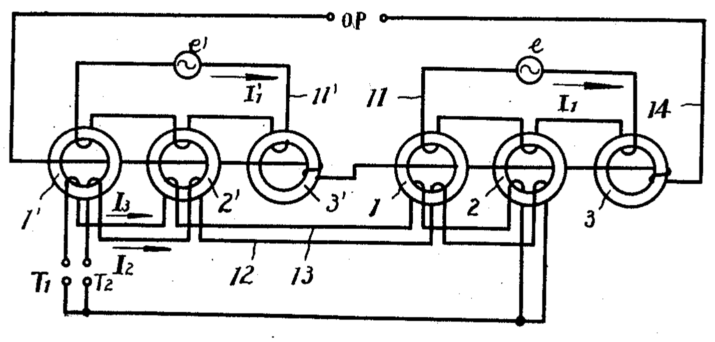
Figs. 3, 4, 5, 6 and 7 are respectively circuit diagrams in cases where the devices of this invention are applied concretely.

Fig. 3 shows an example in a case wherein the said device of this invention is employed, and in which one of the two input signals is coupled to the output circuit. That is, the switching device which consists of the magnetic cores 1, 2 and 3 has entirely the same circuit as in Fig. 1 and the control coils 12, 13 of the switching device which include the magnetic cores 1', 2' and 3' is wound in reverse direction to each other at the magnetic cores 1 and 2. Besides, on the cores 1' and 2', the control coils 12 and 13 are wound in reverse direction, in relation to the input and output windings 11' and 14. And the output coil 14 and the control coils 12 and 13 connect in series with two sets of the switching device which comprise the magnetic cores 1, 2 and 3, and 1', 2', and 3'. Therefore, if the control alternating currents of the same phase are applied to the terminals of the control coil terminals $T_1$ and $T_2$, the signal source $e$ is coupled to the output coil 14 through the magnetic cores 1, 2 and 3. And if the control alternating currents have opposite phases, the signal source $e'$ is coupled to the output winding 14 through the magnetic cores 1', 2' and 3'. Therefore, either signal of two signal sources $e$ and $e'$ can be selectively taken out at the output coil terminal OP.

Figure 4:
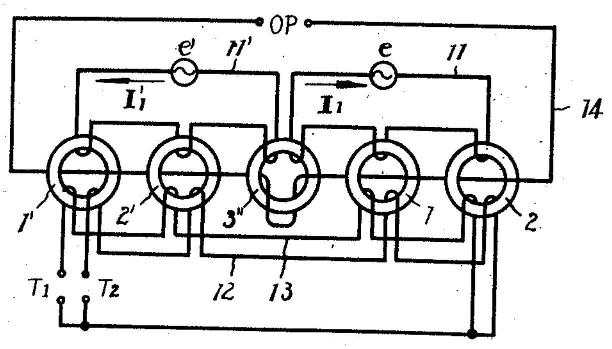

The embodiment of Fig. 4 has the same function and almost the same construction as that in Fig. 3, except a common magnetic core 3'' performs the roles of magnetic cores 3 and 3' in Fig. 3.

Thus if the relation $I_2=-I_3$ holds, the output voltage $V_o$ to the input signal currents $I_1$ and $I_1'$ of the signal sources $e$ and $e'$ is as follows:

$$V_o=24bI_1I_3^2-6b(I'_1I_1^2+I_1I'_1{}^2) \quad (11)$$

And in case where $I_2=I_3$ it becomes, $$V_o=24b(I_1'I_1^2+I_1I_1'^2) \quad (12)$$

But the second terms of these Equations 11 and 12 are small and can be neglected. Moreover, it is possible that when the output terminal is newly considered as the input terminal, single input signal can be coupled to either of two output terminals, because the circuits of Fig. 3 and Fig. 4 are reversible.

Figure 5:
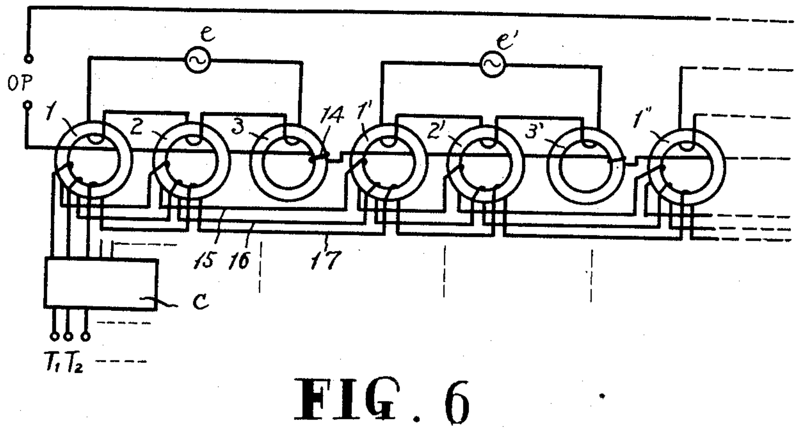

Further, if we want to select one out of many input terminals which is to be coupled to one common output terminal, all input sources $e$, $e'$, $e''$, . . . are coupled to switching devices of the same number with the input sources and each of the switching devices comprises three magnetic cores as 1, 2, 3; 1', 2', 3'; 1'', 2'', 3'', . . ., as shown in Fig. 5. The control windings are also arranged as 15, 16 and 17 . . . and the like. And corresponding to the signal applied at the control terminals $T_1$ and $T_2$ . . ., the control currents are given to them, after proper combination in the circuit C. That is, for example, by means of the multi-hybrid circuit, a control magnetic field is induced only in selected one out of N sets of magnetic cores 1, 2; 1', 2'; 1'', 2''; . . . and cancelled or small enough in the remaining (N–1) sets of magnetic cores. Therefore only one signal can be coupled to the output coil 14.

And the magnetic cores 3, 3', 3'' . . . can be combined properly as in the case of Fig. 4.

The practical applications of the switching device of this invention will be stated as follows. The example shown in Fig. 2, it was stated that the output voltage concerning the polarity between the electric currents $I_2$ and $I_3$ of the control coils 12 and 13 was given by the Equations 9 and 10. If it is assumed that the input signal current $I_1$, control current $I_2$ and $I_3$ have the same frequency, and are sine waves and are either in phase or out-of-phase then:

$$I_1=A_1 \sin \omega t \quad (13)$$

$$I_2=tI_3=tA_3 \sin \omega t \quad (14)$$

That is, assume $I_2$ has a value of either $+I_3$ or $-I_3$, the Equations 9 and 10 become for $$I_2=-I_3$$

$$V_o=6bA_1^3 \sin^3 \omega t$$
$$=-4.5bA_1^3 \sin \omega t+1.5bA_1^3 \sin^3 \omega t \quad (15)$$

and for $$I_2=I_3$$

$$V_o=18bA_1A_3^2 \sin \omega t-6bA_1A_3^2 \sin^3 \omega t -4.5bA_1^3 \sin \omega t+1.5bA_1^3 \sin^3 \omega t$$
$$=4.5bA_1(4A_3^2-A_1^2) \sin \omega t -1.5bA_1(4A_3^2-A_1^2) \sin^3 \omega t \quad (16)$$

Therefore, if the third harmonic wave is removed by a filter, as for example, a resonance circuit, the output voltage is $$V_o=-4.5bA_1^3 \sin \omega t \quad (17)$$

or $$V_o=4.5bA_1(4A_3^2-A_1^2) \sin \omega t \quad (18)$$

As it is clearly known from the said Equations 17 and 18, that when it is assumed $|2A_3|>A_1|$ in the circuit shown in Fig. (2), the output's phase is shifted so that differs by 180 degrees. And assuming the phase of the signal current $I_1$, for example, as 0 radian, and if the phases of $I_2$ and $I_3$ are both either of 0 or $\pi$ radian, then the phase of the output voltage becomes 0 as shown by the Equation 18. If only either of them is $\pi$ or 0 radian and the other is an opposite phase, the phase of the output voltage becomes $\pi$ as given by the Equation 17. And if the phase of $I_1$ is $\pi$, when the phases of $I_2$ and $I_3$ are both either 0 or $\pi$, the output voltage becomes $\pi$ phase. And, on the contrary, when either one of them is 0 or $\pi$ and the other is its opposite phase, the phase of the output voltage becomes 0. Therefore, in the control device of Fig. 2, assuming that the input signal current $I_1$ and the control coil currents $I_3$ are sine waves of the same frequency, and that these currents are considered to be the logical variable, each of which has two phases either of 0 and $\pi$, then the phase of the output voltage will indicate the logical sum of the three numbers modulo 2. That is, the control device of Fig. 2 can be used as modulo 2 adder of binary numbers. And if the amplitude $A_1$ of the current $I_1$ and the amplitude $A_3$ of current $I_2$ or $I_3$, the following relation is given, $$\sqrt{2A_3}=A_1 \quad (19)$$

it is possible to make the amplitude of the output voltages given by the Equations 17 and 18 equal at any time. And the number of turns of the input windings on the magnetic cores 1, 2 and 3 are not necessarily limited to be 1 to 1 to 2. If the polarity of the output voltage which is same as $I_1$ shifts corresponding to cases where $I_2$ and $I_3$ are in-phase or out-of-phase.

Figure 6:
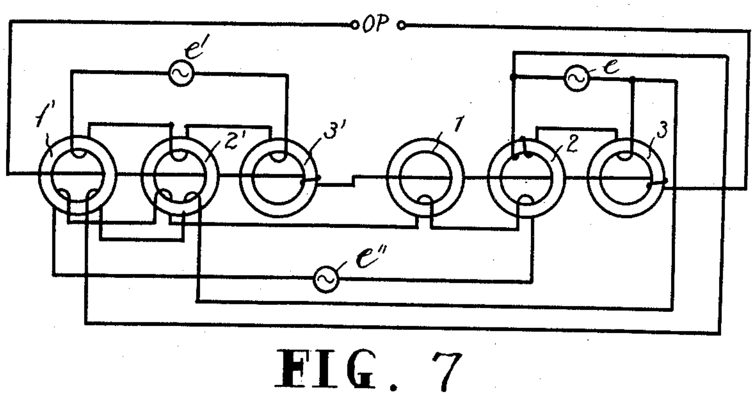
Figure 7:
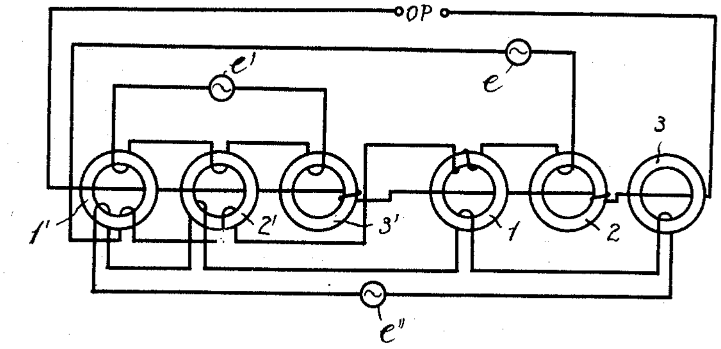

If in the circuit of Fig. 3, the terminal $T_2$ of the control coil 12 is connected with the signal source *e* and the input sginal current $I_1$ of the control coils 12 on the cores 1, 2 and 3 is in phase with the input current, and currents $I_1$ and $I_1'$ that flow in the input coils 11, 11' and the current $I_3$ that flows in the control coil 13 are sine waves which have the same frequency and are in-phase or out-of-phase, for example, then as the phase of $I_1$ and the phase of $I_3$ are always the same, and if $I_1$ and $I_3$ have opposite phases, the output voltage in the output coil has a phase corresponding to the phase of current $I_1'$ of the input coil 11'. And if $I_1$ and $I_3$ are in-phase, the phase of the output voltage corresponds to the phase of $I_1$. That is, when $I_1'$ is always kept at 0 radian, if $I_1$ and $I_3$ have opposite phases to each other or both have 0 radian, the output will have 0 radian. And when $I_1'$ is always kept at $\pi$ radian, if any only if both $I_1$ and $I_3$ have 0 radian. Therefore, if $I_1$ and $I_3$ are representative of two logical variables of binary phase signals, this circuit has the function of a logical addition circuit or logical multiplication circuit. Moreover, by shifting the phase of $I_1$, conversion between an "OR" circuit and "AND" circuit can be carried out quite easily. It is characterized by the fact that the output amplitude always is stable. And in the said Fig. 3, it is quite easy to operate the circuit shown in Fig. 6 and Fig. 7 by proper phase shifting to couple the terminal $T_2$ with the signal source *e'*. And, further, the cores 3 and 3' can be combined together into one core. That is, these circuits can be also operated as the "OR" circuit or "AND" circuit for the binary phase signal of the signal sources *e* and *e'*.

As mentioned above, the switching device of this invention is applicable to the various logical circuits for binary phase signals. And as known, and clearly described in applicant's patent application Serial No. 508,-668 filed on May 16, 1955, in a parametron when a resonant circuit includes at least one non-linear element is excited by a signal whose frequency is double the resonance frequency, an oscillation which has the resonance frequency is induced in the output circuit; and the phase of the output oscillation is controlled so that it is 0 or $\pi$, by the phase of the control signal which is impressed on the resonant circuit. The parametrically excited resonator "parametron," such as mentioned above, is used for a digital computer or the other logical circuits. Therefore, when the switching device of this invention is used as a part of such a computer or in the other heretofore mentioned systems an economy of power, and minimization of equipments and a decrease of operating hours can be carried out. For example, in Fig. 8 (*a*), using the modulo 2 adder A explained in Fig. 2, impress signal of 0 radian which indicate 0 of binary number as one input of it, and the outputs of "parametrons" $P_0$ and $P_1$ as the other input. And then impress the output of modulo 2 adder A is to parametrons $P_2$ and $P_3$ in regular succession. And the output of parametron $P_3$ is fedback to the parametron $P_1$.

And if parametrons $P_0$, $P_1$, $P_2$ and $P_3$ are excited in known manner at the successive excitation periods I, II and III, as long as parametron $P_0$ delivers the signal which indicates 0 of binary number, the same signal is held in a loop of modulo 2 adder A and the parametron $P_2$, $P_3$ and $P_1$, and hold it. But, corresponding to the signal of the input terminal IP, if parametron $P_0$ delivers at the signal which indicates 1, that is, $\pi$ radian, the modulo 2 adder A adds it modulo 2 to the held signal and hereafter, the signal bearing the value is held. Therefore, this circuit has the function of a flip-flop circuit and can take out the output from the output terminal OP, or from other parametron in this loop. And when modulo 2 adder A in the same figure is replaced with the switching device for two input signals such as shown in the Fig. 3, by the control signal given from the terminal G shown by the dotted line, the signal of parametrons $P_0$ or $P_1$ can be delivered optionally to the parametron $P_2$. So parametrons $P_1$, $P_2$ and $P_3$ can function as a register to the signal of parametron $P_0$.

Figure 8:
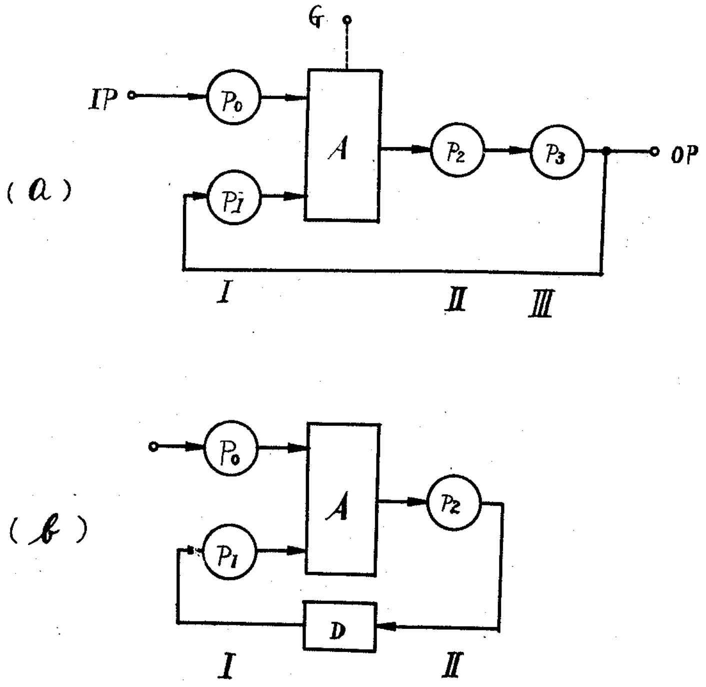
Figs. 8*a* and 8*b* are block diagrams showing by way of example cases where the devices of this invention are applied to the circuits of parametric excited resonators.

Furthermore if the parametron $P_3$ is removed from the circuit of Fig. 8 (*a*) and a directional coupler D is inserted as shown in Fig. 8 (*b*) the parametrons $P_0$, $P_1$ and $P_2$ can be excited at the alternate excitation periods I and II to have the same operation as mentioned above. The device by means of this invention, as shown above, with parametrons, can have various functions and it contains the higher harmonics, over the third harmonic. Therefore, if such means as rid the arrangement of undesirable harmonics by using a resonance circuit, as occasion demands or to carry out the adjustment of the value of voltage and electric current by means of the resistance potential divider are used, various equipments which have other complex functions with the slightest time lag can be obtained.

It will be understood that in this invention, needless to say, a bias magnetic field can be added by direct current, according to circumstances, in order to adjust the characteristic of the magnetic cores.

What I claim is:

1. A switching device comprising, an odd-number of non-linear magnetic core elements, an input coil having turns wound serially on said core elements, an output coil having turns wound on said core elements, means for applying an input alternating current signal to said input coil, means for coupling and uncoupling the input and output coils comprising means for generating unbalanced magnetic fields in said core elements to induce an output signal in said output coil corresponding to the input signal comprising parallel control coils having turns wound serially on an even number of said magnetic cores in opposition to the input and output turns, and means for applying control currents of equal frequencies and the same phase to the control coils to induce said output signal.

2. A switching device according to claim 1, in which said cores are Ferrite torrodial cores.

3. A switching device comprising, two sets of magnetic non-linear elements, each set comprising three core elements, for each set of three core elements an input coil having turns wound serially on said core elements, an output coil having turns wound on one of the core of each set of core elements, means for applying a respective input alternating current to the input coils, means for coupling the input and output coil to induce therein alternatively the input signals comprising, two parallel control coils having turns formed on two only of each of the sets of three cores, means to apply to the control coils control alternating currents of equal frequencies and alternatively of the same phase and opposite phases.

4. A switching device comprising, two sets of magnetic non-linear elements, each set comprising three core elements, one of said cores being common to both sets, for each set of three core elements an input coil having turns wound serially on said core elements, an output coil having turns wound on said common one of the cores of each set of core elements, means for applying a respective input alternating current to the input coils, means for coupling the input and output coil to induce therein alternatively the input signals comprising, two parallel control coils having turns formed on two only of each of the sets of three cores and not including said common core, means to apply to the control coils control alternating currents of equal frequencies and alternatively of the same phase and opposite phases.

References Cited in the file of this patent

UNITED STATES PATENTS

| | | |
|---|---|---|
| 2,666,151 | Rajchman et al. | Jan. 12, 1954 |
| 2,696,347 | Lo | Dec. 7, 1954 |
| 2,729,807 | Paivinen | Jan. 3, 1956 |
| 2,846,671 | Yetter | Aug. 5, 1958 |